United States Patent [19]
Luebke et al.

[11] 3,964,637
[45] June 22, 1976

[54] DEEP FRYER RECEPTACLE COVER AND OPERATING MECHANISM THEREFOR

[75] Inventors: Clem J. Luebke, Beloit, Wis.; Norman L. Beck, Rockton; Lowell W. Daniels, Rockford, both of Ill.

[73] Assignee: The Broaster Co., Rockton, Ill.

[22] Filed: Sept. 11, 1975

[21] Appl. No.: 612,272

[52] U.S. Cl. .............................. 220/314; 220/316; 99/403
[51] Int. Cl.² ........................................ B65D 45/28
[58] Field of Search .......... 220/314, 316, 249, 252, 220/331, 345, 346, 348; 99/403; 49/379, 404; 126/373, 345–348

[56] References Cited
UNITED STATES PATENTS

| | | | |
|---|---|---|---|
| 2,917,200 | 12/1959 | Phelan et al. | 220/316 |
| 2,942,753 | 6/1960 | Kelton | 220/331 |
| 3,124,158 | 3/1964 | Penfold | 220/316 X |

*Primary Examiner*—George T. Hall
*Attorney, Agent, or Firm*—Meyer, Tilberry & Body

[57] ABSTRACT

An improved cover support and operating mechanism is disclosed for use with the cooking vessel of deep fat frying apparatus. The vessel has an opening and the cover is supported in a plane transverse to the axis of the opening by a cross bar and a pair of vertical posts which are vertically reciprocable relative to the vessel to move the cover between open and closed positions. A spring arrangement is provided for biasing the post and thus the cover toward the open position, and a hand actuable latching arrangement is provided to releaseably hold the cover in the closed position against the spring bias.

22 Claims, 5 Drawing Figures

DEEP FRYER RECEPTACLE COVER AND OPERATING MECHANISM THEREFOR

This invention relates to the art of cooking apparatus and, more particularly, to a cover and operating mechanism for the cooking vessel of deep fat frying apparatus.

Deep fat frying apparatus has been provided heretofore which includes a vessel adapted to receive and hold a quantity of cooking oil in which food to be cooked is immersed. The food is supported in a basket which is introduced into the cooking vessel, and a cover for the vessel is then closed and latched to seal the opening during the cooking operation. The cooking takes place under pressure to minimize oil absorption and to reduce cooking time. Apparatus of this character is widely used commercially to quickly prepare large quantities of such foods as chicken, shrimp and fish fillets.

The operation of such cooking apparatus exposes a user thereof to the hazards of high temperature, hot grease and exhausting steam when the cover is opened following the cooking operation. Cover structures and cover operating arrangements heretofore provided in conjunction with such cooking apparatus have not afforded the desired degree of safety to the user with respect to exposure to hazardous conditions including those mentioned above. In this respect, the cover member is generally pivotal about a horizontal axis adjacent the cooking vessel opening and must be manually pivoted from the closed to the opened position following a cooking operation, such as by means of a handle on the cover adjacent the side edge thereof. The cover, of course, becomes extremely hot during a cooking operation, and the location of the handle exposes the latter to such heat. Accordingly, care must be taken to be sure that the user is not burned by grasping the handle during the opening operation. Often, the latching arrangement for the cover is separate from the handle and located on or adjacent the side edge of the cover. Accordingly, the latch mechanism is apt to become extremely hot during the cooking operation. The latching arrangement must be manually manipulated to release the cover and, accordingly, care must be taken by the user to avoid being burned during manual release thereof.

The high pressure within the vessel following the cooking operation is supposed to be and most often is released prior to unlatching and opening the cover. However, even if the pressure is reduced, a certain amount of steam escapes about the periphery of the cover when the latter is unlatched and initially moved toward the open position. With a cover pivotally mounted adjacent the side of the vessel opening, such initial movement provides an exhaust passage for such steam primarily at the location of the cover diametrically opposite the pivot axis. Generally, this location corresponds to the area of the apparatus in which the latching mechanism and cover handle are located. Accordingly, the hands of the user may be in the path of and thus exposed to the initial outrush of steam.

Yet another disadvantage in connection with pivotal cover arrangements for deep fat cooking apparatus is the effort required to pivot the cover between the open and closed positions thereof. In this respect, upon release of the cover latch the weight of the cover must be manually lifted and supported during the ensuing opening and closing movements. During this pivotal movement the user's arms move across the opening and are thus exposed to uprising heat from within the cooking vessel. Moreover, when the cover is in the open position it is generally inclined slightly from vertical and in the direction away from the vessel opening and, accordingly, is subject to being unintentionally moved slightly in the closing direction past the vertical orientation so as to fall by gravity to the closed position. Such uncontrolled closing movement is hazardous to a user who may have his hands exposed adjacent the vessel opening, and the impact of the cover with the edge of the vessel opening can damage one or the other, or both, of these components and/or the sealing relationship therebetween.

In accordance with the present invention, an improved cover and operating mechanism is provided for deep fat cooking apparatus by which the foregoing disadvantages and others of previous arrangements are minimized or avoided. More particularly in accordance with the present invention, the cover of such apparatus is supported in a plane transverse to the axis of the cooking vessel opening for reciprocating movement axially of the opening between the opened and closed positions. Accordingly, initial opening movement of the cover provides a uniform escape passage for steam about the entire periphery of the cover to avoid the outrush of steam in any one given direction laterally of the cover. Further, the cover is biased to move to the open position upon release thereof following a cooking operation, whereby manual lifting of the cover and the hazards thereof are avoided.

In accordance with another aspect of the invention, an improved latching mechanism is provided to releaseably hold the cover in the closed position. The latching mechanism is spaced from the cover edge and vessel opening and is structurally associated with the apparatus to minimize heat transfer thereto. Moreover, the latching mechanism is adapted to be manually actuated to release the cover and is automatically displaced into the latched position with respect to the cover when the cover is moved to its closed position. Additionally, in accordance with a preferred embodiment, the latch mechanism is locked against actuation during a cooking operation when high pressure exists within the cooking vessel.

It is accordingly an outstanding object of the present invention to provide an improved cover and cover latching arrangement for deep fat type cooking apparatus.

Another object is the provision of an arrangement of the foregoing character by which safety to operating personnel is improved.

Yet another object is the provision of an arrangement of the foregoing character in which the cover releasing and latching mechanism is spaced from the cover and cooking vessel opening and is located to minimize heat transfer thereto, thus to minimize exposure of operating personnel to hot apparatus components.

Still another object is the provision of an arrangement of the foregoing character in which manual movement of the cover to the open position is avoided, thus to decrease hazardous conditions to operating personnel especially during the potentially dangerous opening operation following the cooking process.

A further object is the provision of an improved arrangement of the foregoing character in which the cover is supported in a plane transverse to the axis of the opening of the cooking vessel, and is moved axially of the opening between opened and closed positions with respect thereto.

Still a further object is the provision of an improved arrangement of the foregoing character in which the cover is biased to move to the open position upon release of the latching mechanism and wherein the latching mechanism is biased to automatically latch the cover in the closed position upon movement of the cover to the latter position.

Yet a further object is the provision of an improved arrangement of the foregoing character in which actuation of the latching mechanism to release the cover is restrained during a cooking process.

Yet another object is the provision of an improved cover and latching arrangement for deep fat cooking apparatus which is structurally simple, economical to construct and install, and efficient, reliable and safe in operation.

The foregoing objects and others will in part be obvious and in part pointed out more fully hereinafter in conjunction with the written description of a preferred embodiment of the invention illustrated in the accompanying drawings in which:

FIG. 3 is a sectional elevation view taken along line 3—3 in FIG. 2;

Figure 1:
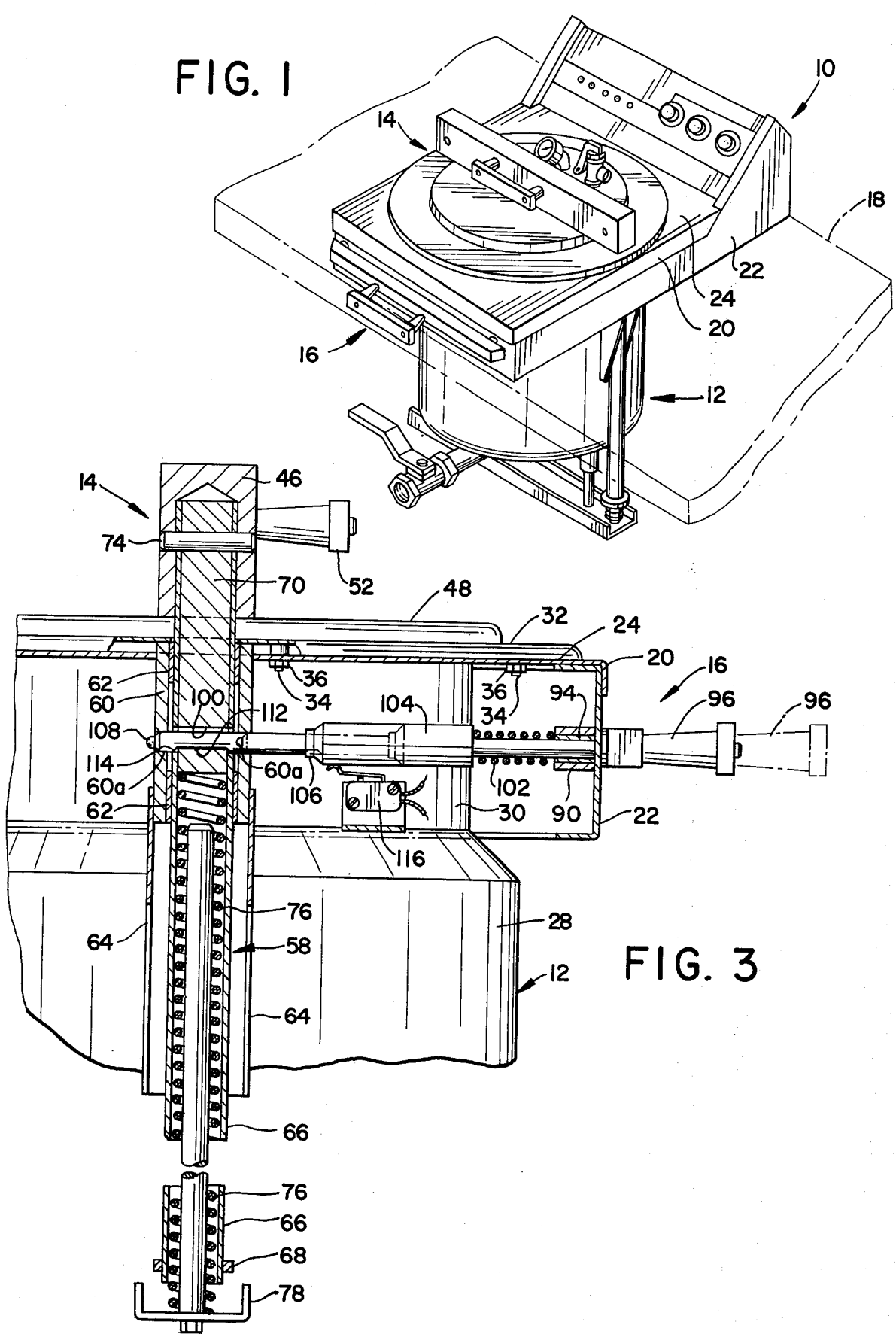
FIG. 1 is a perspective view of deep fat frying apparatus employing the cover and latch arrangement of the present invention.

Referring now in greater detail to the drawings wherein the showings are for the purpose of illustrating a preferred embodiment of the invention only and not for the purpose of limiting the invention, deep fat-type cooking apparatus is illustrated in FIG. 1 which includes a frame 10, a cooking vessel 12, a cover assembly 14, and a latch mechanism 16. In the embodiment shown, frame 10 is mounted on a suitable support surface such as a counter top 18, and cooking vessel 12 depends beneath the frame and through a suitable opening provided in counter 18.

Figure 2:
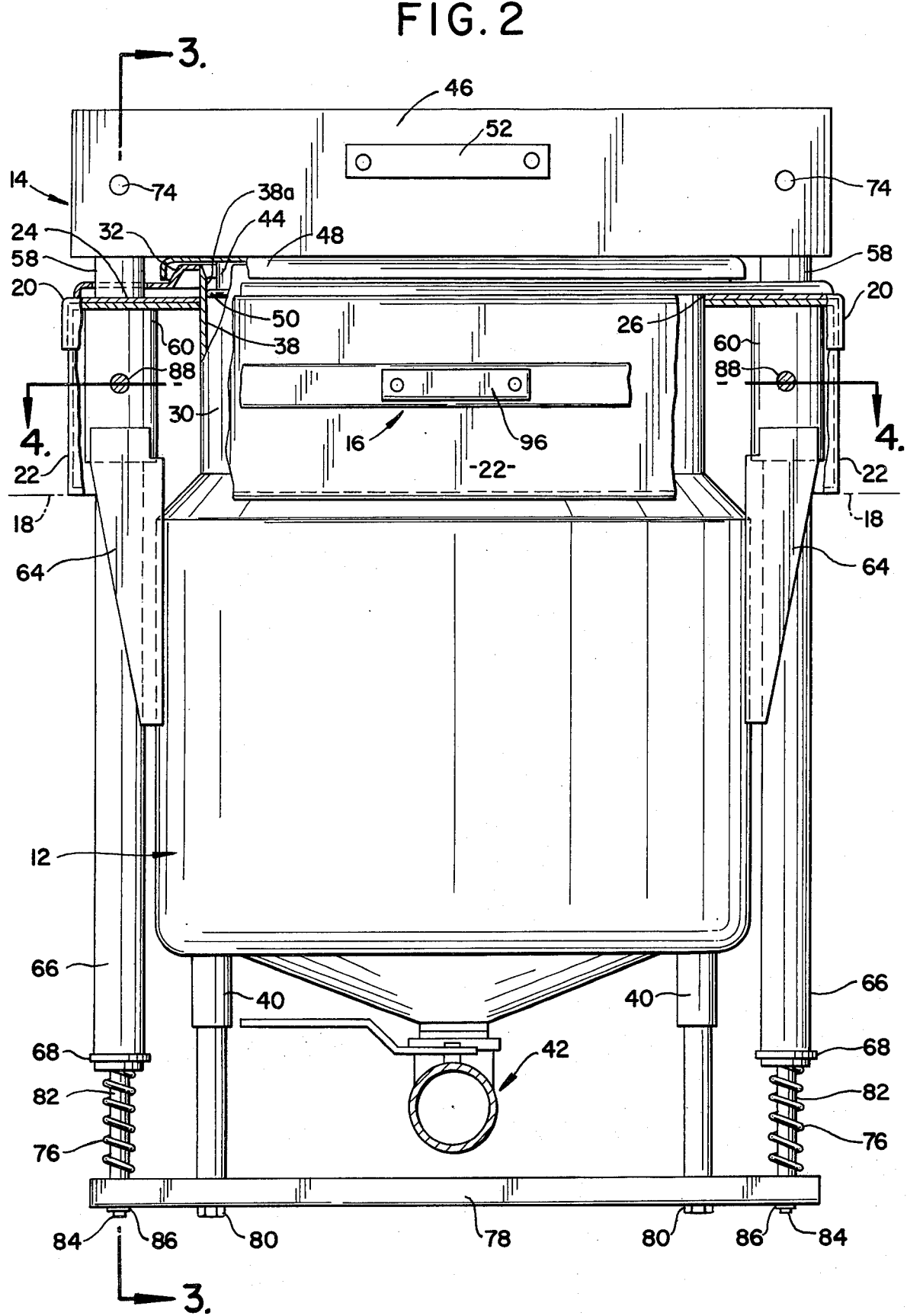
FIG. 2 is an elevation view, partially in section, of the apparatus shown in FIG. 1.

As best seen in FIGS. 2 and 3, frame 10 includes upper and lower portions 20 and 22, respectively, of sheet metal construction. Upper portion 20 includes a horizontal top wall 24 provided with an opening 26 to receive the open upper end of cooking vessel 12. In the embodiment shown, cooking vessel 12 is a cylindrical receptacle having a lower portion 28 and a smaller diameter upper portion 30 which extends through opening 26 and is provided with a radially outwardly extending peripheral mounting flange 32 which engages top wall 24 of upper frame portion 20. The cooking vessel is interconnected with wall 24 such as by means of studs 34 welded to the underside of flange 32 and extending through corresponding openings in wall 24, and suitable nuts 36 interengaged with studs 34.

Upper end 30 of cooking vessel 12 provides a circular opening 38 into the vessel, and the periphery of opening 38 adjacent the entrance end thereof provides a seat 38a which seals with the cover as set forth more fully hereinafter. The bottom of cooking vessel 12 is provided with a pair of depending mounting legs 40, for the purpose set forth hereinafter, and with a drain assembly 42 including a suitable valve, not designated numerically, by which fat or grease can be drained from the receptacle. It will be appreciated that the fat within cooking vessel 12 is adapted to be heated and elevated to cooking temperature. The manner in which such heating is achieved is not important to the present invention and, accordingly, is not illustrated. As an example, such heating can be achieved through the use of electric resistance-type heating elements disposed within the cooking receptacle.

Cover assembly 14 includes a cover member 44 mounted on a horizontally extending yoke bar 46 together with a shield 48 which overlies the radial inner portion of receptacle flange 32 when the cover is in the closed position. Cover 44 includes a peripheral seal 50 which sealingly engages seat 38a of opening 38 when the cover is in the closed position. One side of yoke bar 46 is provided with a handle 52 by which the cover is adapted to be moved to the closed position thereof as set forth more fully hereinafter. A suitable pressure gauge 54 and relief valve 56 are mounted on the cover assembly on the opposite side of yoke bar 46 from handle 52, and it will be appreciated that these components are adapted to be in communication with the interior of cooking vessel 12 to perform their respective functions during a cooking operation.

Yoke bar 46 supports cover 44 in a horizontal plane transverse to the axis of opening 38 into the cooking vessel. Further, cover 44 is reciprocable vertically and thus axially of opening 38 between open and closed positions relative to the latter opening. More particularly, the opposite ends of yoke bar 46 are interconnected with corresponding vertical posts 58 which, preferably are located on diametrically opposite sides of cooking vessel 12. Posts 58 are supported for vertical reciprocation relative to frame 10 and cooking vessel 12 by means of a corresponding cylindrical sleeve 60 having bearing sleeves 62 at its opposite ends slidably receiving the corresponding posts 58. Sleeves 60 are mounted in fixed positions relative to frame 10 and cooking vessel 12 by means of corresponding pairs of bracket elements 64 welded or otherwise secured to sleeve 60 and to lower portion 28 of cooking vessel 12. It will be appreciated, of course, that flange 32 is provided with suitable openings through which posts 58 extend.

Each post 58 is comprised of a cylindrical tube 66, the lower end of which is open and provided externally with a peripheral stop collar 68 attached thereto such as by welding. The upper end of each tube 66 receives a solid circular plug 70 which is press fitted or otherwise secured within tube 66. The upper end of each post 58 extends into a corresponding opening 72 in yoke bar 46 and is attached thereto such as by means of a pin 74. It will be appreciated that yoke bar 46 and cover 44 are therefore adapted to be elevated relative to the entrance end of opening 38 of the cooking vessel a distance corresponding to the distance between the lower ends of sleeves 60 and the corresponding stop collar 68.

Cover 44 is biased toward the open position thereof by means of coil springs 76 disposed within tubes 66 of posts 58. Each spring 76 has an upper end abutting against the inner end of the corresponding plug 70, and a lower end abutting against a support member 78 which is mounted on cooking vessel 12 such as by means of bolts 80 engaged with legs 40 depending from the bottom of the cooking vessel. Preferably, each spring 76 has an extended length when assembled as shown to elevate cover 44 such that stop collars 68 engage the lower ends of sleeves 60. To facilitate guidance of the vertical movement of posts 58 and retention of springs 76 against lateral displacement when the cover assembly is in the elevated position, each post and spring assembly is provided with a vertical guide rod 82 which is concentric with the corresponding tube 66 and surrounded by spring 76. The lower end of each guide rod 82 is suitably interconnected with support member 78 and, in the embodiment shown, this is achieved by providing the lower end of each rod with a reduced diameter portion 84 extending through a corresponding opening in support member 78 therefor and provided beneath support member 78 with a suitable retaining ring 86.

Figure 4:
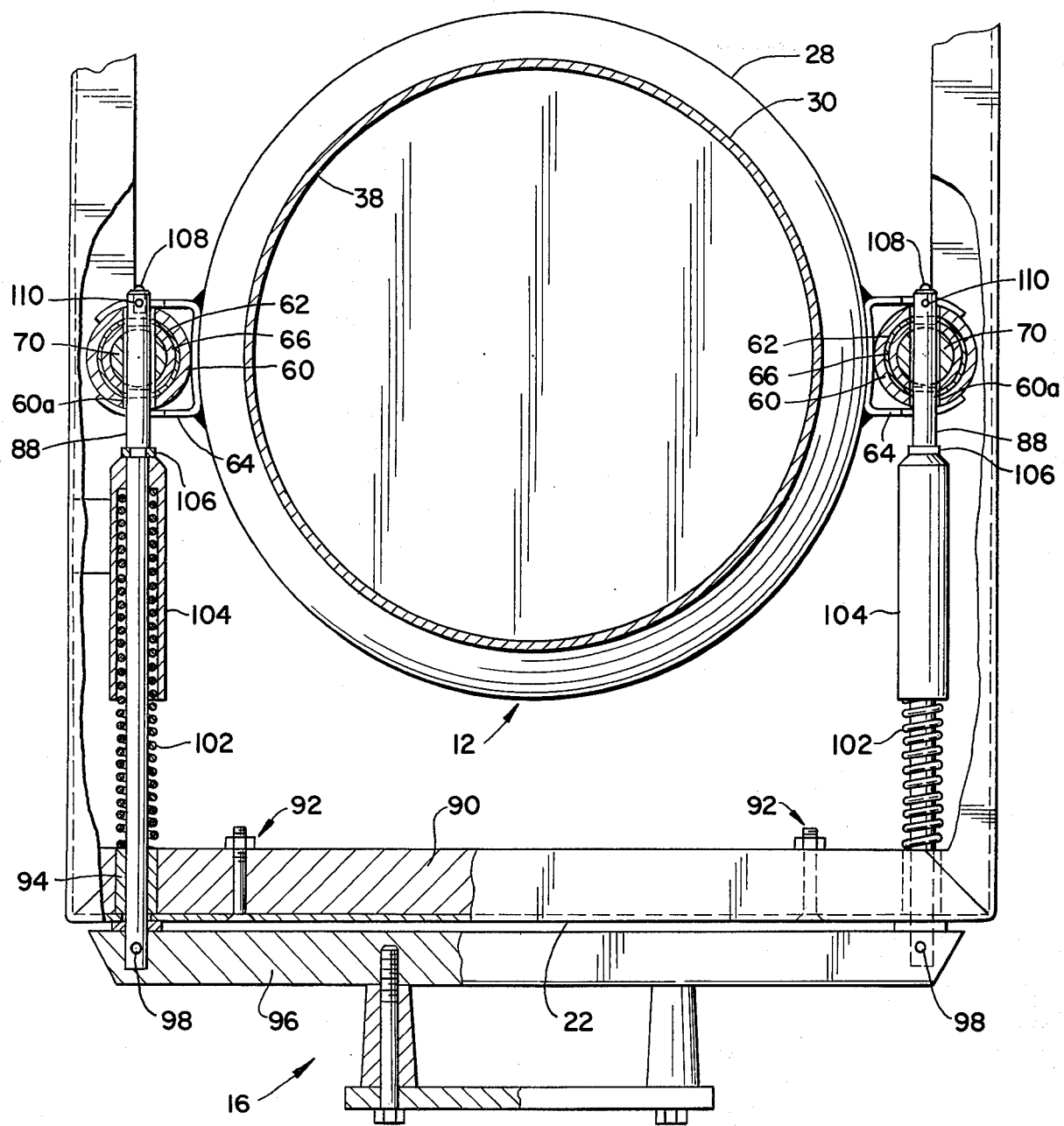
FIG. 4 is a plan view, in section, taken along line 4—4 in FIG. 2.

Cover 44 is releaseably retained in the closed position against the bias of springs 76 by latch assembly 16. As best seen in FIGS. 3 and 4, the latch assembly includes a pair of latch pins 88, one for each of the posts 58. Latch pins 88 extend generally horizontal and parallel to one another and are supported for reciprocation toward and away from the corresponding post by a guide bar 90 mounted on lower frame portion 22, such as by means of nut and bolt assemblies 92. Guide bar 90 is provided with openings through which the outer ends of the latch pins extend and which openings, preferably, are provided with bearing sleeves 94 slidably receiving the latch pins.

The outer ends of latch pins 88 are interconnected with a common operating or latch handle 96 to achieve simultaneous reciprocating displacement thereof. In this respect, openings are provided in handle 96 receiving the outer ends of the latch pins, and the latch pins are attached to the handle such as by means of pins 98. The inner ends of latch pins 88 are adapted to extend through latch pin receiving openings in the corresponding post 58 and support sleeve 60 to retain the cover assembly and thus cover 44 in the closed position. More particularly, each sleeve 60 is provided with diametrically opposed pin receiving openings 60a aligned with the corresponding pin 88, and the corresponding tube 66 and plug 70 are provided with a pin receiving opening 100 extending therethrough and which is adapted to be axially aligned with the corresponding latch pin wwhen cover 44 is in the closed position.

Latch pins 88 are spring biased toward the latching positions thereof in which the inner ends extend through openings 60a and 100, as shown in FIGS. 3 and 4. Preferably, movement of the latch pins to release the cover assembly is limited such that the innermost end of each latch pin is not withdrawn from the opening 60a facing the latch operating handle. The latch pin bias is provided by means of corresponding coil spring 102, and the limited movement of the latch pins in the direction of withdrawal to release the cover assembly is provided by means of a corresponding stop sleeve 104 on each latch pin. More particularly, as seen in FIG. 4, each latch pin 88 is provided intermediate its opposite ends with a stop sleeve 104 having an inner end retained in spaced relationship with respect to the innermost end of pin 88 by means of a retaining ring 106. Sleeve 104 has an axial length in the direction from retaining ring 106 toward guide bar 90 such that the outer end of the sleeve engages guide bar 90 when the innermost end of latch pin 88 is disposed in the latch pin receiving opening 60a facing the handle, as shown by the broken line position of the latch pin in FIG. 3. Spring 102 surrounds latch pin 88 and has its inner end in abutment with a shoulder provided within sleeve 104 and its outer end in abutment with guide bar 90. Preferably, the innermost end of each guide pin 88 is provided with a bearing tip 108 of bronze or the like in the form of an insert retained in latch pin 88 such as by means of a pin 110.

Figure 5:
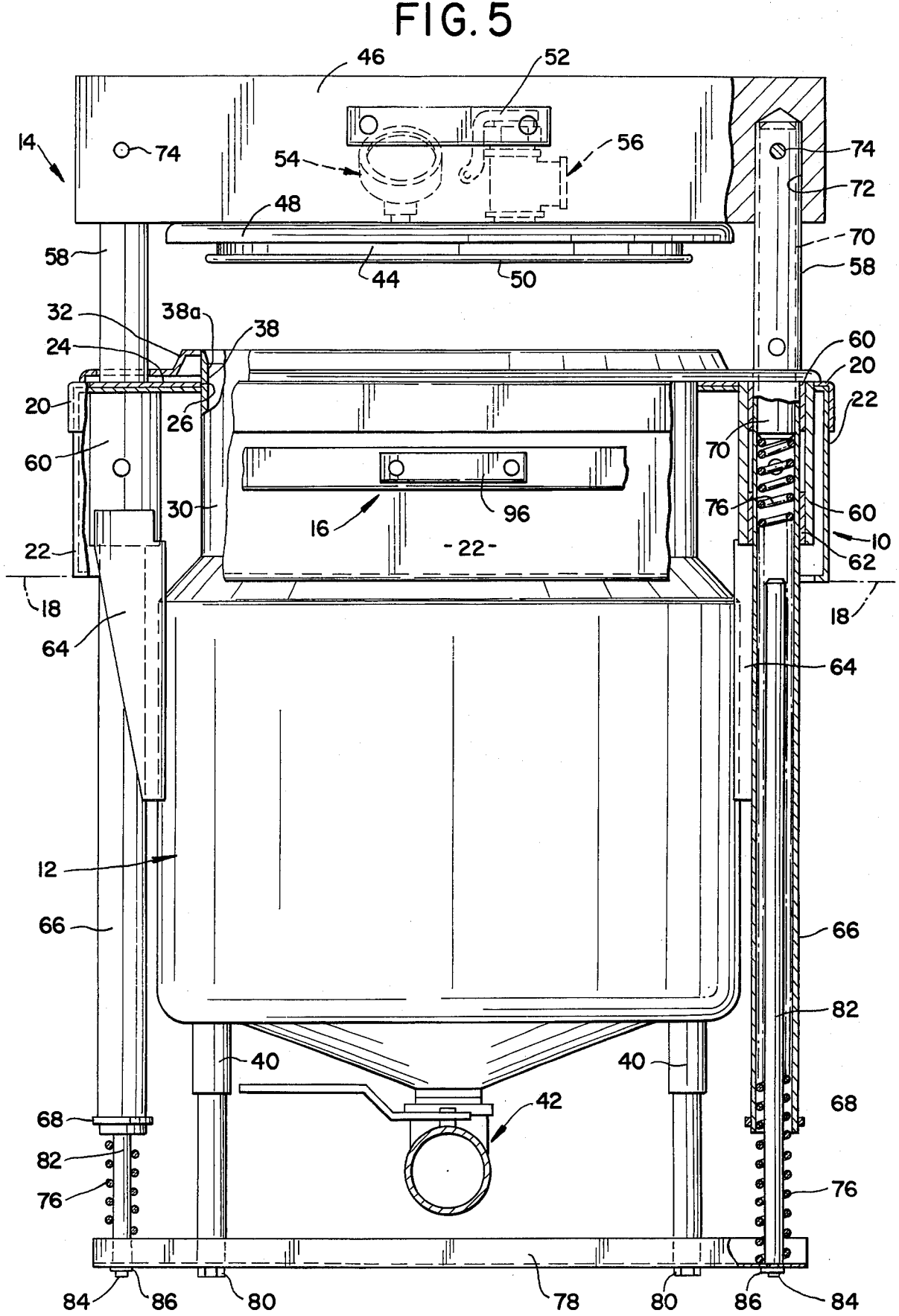
FIG. 5 is an elevation view similar to FIG. 2 but showing the cover partially open.

From the foregoing description, it will be appreciated that displacement of latch pins 88 from the solid line position to the broken line position shown in FIG. 3 is achieved by pulling handle 96 outwardly relative to frame portion 22. When the innermost ends of latch pins 88 clear opening 100 in the corresponding post 58, spring 76 biases the cover assembly upwardly to move cover 44 to the open position thereof. As soon as opening 100 moves upwardly out of alignment with openings 60a in sleeve 60, as seen in FIG. 5, latch handle 96 can be released so that springs 102 bias latch pins 88 toward posts 58. Bearing tips 108 then ride along the outer surfaces of tubes 66 of the posts 58. When it is desired to move cover 44 to the closed position thereof, yoke handle 52 is displaced downwardly to move cover assembly 14 downwardly. When openings 100 in posts 58 move into alignment with sleeve openings 60a, latch springs 102 operate automatically to bias latch pins 88 inwardly for the inner ends thereof to enter openings 100 and openings 60a on the side of sleeve 60 facing away from handle 96.

Preferably, the inner ends of latch pins 88 are provided with downwardly facing recesses 112 each having an axial length at least equal to the axial length of the corresponding pin receiving opening 100 through post 58. When the latch pins are in the fully latched position thereof, as seen in FIG. 3, each recess 112 is located to receive a portion of the corresponding post 58 defined by the lower marginal edge of opening 100 therethrough. Spring 76 biases the corresponding post 58 into recess 112, and the recess has a radial depth relative to latch pin 88 sufficient to provide for shoulder 114 at the inner end of the recess to engage post 58 and restrain displacement of the latch pin in the direction to release the cover assembly. Accordingly, the recess and post provide an interlock which restrains release of the cover assembly without first depressing the cover assembly by means of yoke handle 52 to remove post 50 from recess 112 so that the latch pins can be withdrawn. Moreover, during a cooking operation the pressure within the cooking vessel increases the seating force of post 58 against the bottom of recess 112 making it virtually impossible to actuate the latch mechanism to release the cover assembly during a cooking operation.

If desired, as shown schematically in FIG. 3, a limit switch 116 can be associated with sleeve 104 of one of the latch pins to control a circuit function in response to movement of the latch assembly to the cover releasing position. Such a switch could, for example, be positioned relative to sleeve 104 so as to require completion of latch engagement when the cover assembly is closed in order to energize a circuit which would then allow pressure to build up in the cooking vessel. In other words, in the event that the latching mechanism should for some reason fail to move completely into the latched position, no pressure could be built up in the cooking vessel to create an unsafe condition.

While considerable emphasis has been placed herein on the specific structures and structural interrelationships between the components of the preferred assembly, it will be appreciated that many changes can be made without departing from the principles of the present invention. In this respect, for example, more than two post assemblies could be employed to support the cover for reciprocating movement, and the posts could be located other than in diametrically opposed positions with respect to the cover and receptacle opening. Further, it will be appreciated that the frame assembly for supporting the cooking vessel, cover assembly and latch mechanism could be structured to be supported on an underlying surface such as a floor as opposed to a frame structured for supporting the apparatus in suspension as disclosed herin. Additionally, it will be obvious in connection with the supporting frame that the sleeves or components corresponding thereto which slidably receive the posts of the cover assembly, and the guide pins extending into the lower ends of the posts, can be mounted on the frame structure as opposed to being mounted on the cooking vessel as shown herein.

Many embodiments of the present invention may be made, and many changes aand modifications of the preferred embodiment can be made in addition to those enumerated hereinabove without departing from the principles of the present invention. Accordingly, it is to be distinctly understood that the descriptive matter herein is to be interpreted merely as illustrative of the present invention and not as a limitation.

What is claimed is:

1. Cooking apparatus comprising, cooking vessel means having an opening thereinto, frame means supporting said cooking vessel means, a cover for said opening extending transverse to the axis of said opening, cover support means supporting said cover for reciprocating movement relative to said frame means and cooking vessel means and axially of said opening between open and closed positions with respect thereto, means biasing said cover to move toward said open position, and means for interengaging said frame means and said cover support means to releaseably hold said cover in said closed position.

2. Cooking apparatus according to claim 1, wherein said cover support means includes at least two support posts having outer and inner ends and cross member means interconnected with said outer ends of said posts, said cover being mounted on said cross member means, and means supporting said posts for reciprocating movement parallel to said opening axis.

3. Cooking apparatus according to claim 2, wherein said means supporting said posts for reciprocating movement includes corresponding sleeve means fixed with respect to said frame means and said cooking vessel means and receiving said posts.

4. Cooking apparatus according to claim 2, wherein said at least two posts include a pair of posts radially outwardly of said opening on diametrically opposite sides thereof.

5. Cooking apparatus according to claim 4, wherein said means supporting said posts for reciprocating movement includes corresponding sleeve means fixed with respect to said frame means and said cooking vessel means and receiving said posts.

6. Cooking apparatus according to claim 5, wherein a portion of each said post from the inner end thereof toward the outer end is tubular, and a guide rod for each post fixed with respect to said frame means and said cooking vessel means and extending into said tubular portion through the inner end of the post.

7. Cooking apparatus according to claim 6, wherein said means biasing said cover includes spring means for each post biasing the post in the direction from said inner end toward said outer end.

8. Cooking apparatus according to claim 7, wherein said spring means is a coil spring in said tubular portion of the post and surrounding said guide rod.

9. Cooking apparatus according to claim 1, wherein said means for interengaging said frame means and said cover support means includes keeper means on said cover support means and latch means supported on said frame means for movement between latched and unlatched positions with respect to said keeper means.

10. Cooking apparatus according to claim 9, and latch spring means biasing said latch means toward said latched position.

11. Cooking apparatus according to claim 9, wherein said cover support means includes a pair of posts, means supporting said posts for reciprocating movement parallel to the axis of said vessel means opening, said latch means including a reciprocable latch pin for each post, and said keeper means being a latch pin opening in each post to receive the corresponding latch pin when said cover is in said closed position.

12. Cooking apparatus according to claim 11, wherein each said latch pin opening extends through the corresponding post, and the corresponding latch pin includes an axial portion extending through said latch pin opening when the pin is in said latched position, said axial portion of said latch pin having a recess therein interengaging with said post to restrain said latch pin against movement from said latched position when said cover is in the closed position thereof.

13. Cooking apparatus according to claim 11, wherein each said latch pin has an outer and inner end, said inner ends being received in said latch pin opening in the corresponding one of said posts, cross bar means interconnecting said outer ends of said latch pins for reciprocating movement together, and means biasing said latch pins toward said latched position.

14. Cooking apparatus according to claim 13, wherein said frame means includes guide means having openings receiving said latch pins between said inner and outer ends thereof and guiding reciprocating movement of said latch pins, said means biasing said latch pins including a coil spring surrounding each pin, each pin having spring abutment means thereon, and each said spring being disposed between said latch pin guide means and the corresponding abutment means.

15. Cooking apparatus according to claim 14, wherein said means supporting said posts for reciprocating movement includes sleeve means receiving each post, each sleeve means including an opening therethrough receiving the inner end of the corresponding latch pin and disposed in alignment with said latch pin opening in the post when said cover is in the closed position, said inner end of said pin extending through said latch pin opening when said latch pin is in the latched position, and said inner end of said pin including a recess interengaging with said post to restrain said latch pin against movement from said latched position when said cover is in the closed position.

16. Cooking apparatus according to claim 14, wherein said posts have outer and inner ends and said cover support means further includes a cross member interconnected with said outer ends of said posts for reciprocating movement with said posts, said cover being mounted on said cross member, a portion of each said post from the inner end thereof toward the outer end being tubular, said means supporting said posts for reciprocation including sleeve means fixed with respect to said frame means and cooking vessel means and receiving a corresponding one of said posts between said inner and outer ends thereof, and a guide rod for each post fixed with respect to said frame means and cooking vessel means and extending into said tubular portion through the inner end of the post.

17. Cooking apparatus according to claim 16, wherein said means biasing said cover includes a coil spring for each post biasing the post in the direction from said inner end toward said outer end, said spring being disposed in said tubular portion and surrounding said guide rod.

18. Cooking apparatus according to claim 17, wherein each said sleeve means receiving said posts has an opening therethrough receiving the inner end of the latch pin for the corresponding post and disposed in alignment with said latch pin opening in the post when said cover is in the closed position, said inner end of said latch pin extending through said latch pin opening when said latch pin is in the latched position, and said inner end of said latch pin including a recess interengaging with said post to hold said latch pin against movement from said latched position when said cover is in the closed position.

19. Cooking apparatus comprising, cooking vessel means having an opening thereinto, frame means supporting said cooking vessel means, a cover for said opening, cover support means supporting said cover for movement relative to said frame means and cooking vessel means and between open and closed positions with respect to said opening, means biasing said cover toward said open position, a pair of latching pins supported by said frame means for reciprocation along parallel axes in a plane intersecting the axis of said vessel means opening, said pins having opposite ends, means interconnecting corresponding ones of said opposite ends for said pins to reciprocate together between latched and unlatched positions, said cover support means including a latch pin opening for each of said pins axially aligned with the corresponding pin when said cover is in the closed position, and the others of said opposite ends of said pins being receivable in said latch pin openings when said cover and pins are respectively in the closed and latched position thereof.

20. Cooking apparatus according to claim 19, and means biasing said latching pins toward the latched position thereof.

21. Cooking apparatus according to claim 20, wherein said latching pins each include means interengaging with the corresponding latch pin opening when said pins are in the latched position to hold said pins against movement toward the unlatched position thereof.

22. Cooking apparatus according to claim 21, wherein said means biasing said latching pins is a coil spring surrounding each said pin between said opposite ends and operatively captured between said frame means and a spring abutment on the corresponding pin.

* * * * *